(12) United States Patent
Brosig et al.

(10) Patent No.: US 8,090,502 B2
(45) Date of Patent: Jan. 3, 2012

(54) METHOD AND DEVICE FOR REDUCING UNWANTED EXCITATIONS AT A STEERING WHEEL

(75) Inventors: Stefan Brosig, Hankensbüttel (DE); Konstantin Sedlan, Braunschweig (DE); Andreas Marx, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 1078 days.

(21) Appl. No.: 11/335,260

(22) Filed: Jan. 19, 2006

(65) Prior Publication Data

US 2006/0180369 A1 Aug. 17, 2006

(30) Foreign Application Priority Data

Jan. 19, 2005 (DE) .................. 10 2005 003 180

(51) Int. Cl.
*B62D 6/06* (2006.01)
(52) U.S. Cl. ........... 701/42; 180/204; 180/6.44; 701/29; 701/36; 701/41; 701/43; 340/425.5; 340/438; 340/458; 73/570; 73/117.01; 73/117.02
(58) Field of Classification Search .......... 701/1, 29–47; 180/410, 421, 443–446
See application file for complete search history.

(56) References Cited

U.S. PATENT DOCUMENTS

| | | | | |
|---|---|---|---|---|
| 3,881,567 A * | 5/1975 | Leiber ............................ | 180/422 |
| 4,660,671 A * | 4/1987 | Behr et al. ..................... | 180/446 |
| 4,800,975 A * | 1/1989 | Oshita et al. ................... | 180/446 |
| 4,933,852 A * | 6/1990 | Lemelson ....................... | 701/30 |
| 5,467,279 A * | 11/1995 | Wada et al. .................... | 701/42 |
| 5,480,000 A * | 1/1996 | Daido et al. ................... | 180/446 |
| 5,913,913 A * | 6/1999 | Okanoue et al. ............... | 701/41 |
| 5,979,587 A * | 11/1999 | Liubakka et al. ............. | 180/446 |
| 6,107,767 A * | 8/2000 | Lu et al. ........................ | 318/561 |
| 6,120,046 A * | 9/2000 | Daly .............................. | 280/90 |
| 6,219,603 B1 * | 4/2001 | Yamamoto et al. ............ | 701/41 |
| 6,219,604 B1 * | 4/2001 | Dilger et al. ................... | 701/41 |
| 6,856,871 B2 | 2/2005 | Mould et al. | |
| 6,901,320 B2 * | 5/2005 | Yao et al. ........................ | 701/44 |
| 7,379,802 B2 | 5/2008 | Kasbarian et al. | |
| 7,455,146 B2 * | 11/2008 | Brosig et al. ................. | 180/272 |
| 2002/0175017 A1 * | 11/2002 | Smith et al. .................. | 180/400 |
| 2003/0060955 A1 * | 3/2003 | Suissa ............................ | 701/41 |
| 2003/0106736 A1 * | 6/2003 | Kogiso et al. ................ | 180/446 |
| 2004/0011156 A1 * | 1/2004 | Morgan et al. ................. | 74/552 |
| 2004/0016306 A1 * | 1/2004 | Fujiwara et al. ......... | 73/862.331 |
| 2004/0084887 A1 * | 5/2004 | Loh et al. ..................... | 280/779 |

(Continued)

FOREIGN PATENT DOCUMENTS

DE 196 44 528 C1 4/1998

(Continued)

OTHER PUBLICATIONS

French Search Report dated May 19, 2009.

*Primary Examiner* — Tuan C. To
*Assistant Examiner* — Jonathan M Dager

(57) ABSTRACT

A device and a method for reducing unwanted or undesireable excitations at a steering wheel include a sensor system with which unwanted excitation at a steering wheel and/or steering gear can be sensed. A closed-loop control unit is configured to generate an additional steering torque on the basis of the sensed unwanted excitation. A servomotor applies the additional steering torque to the steering gear.

7 Claims, 2 Drawing Sheets

U.S. PATENT DOCUMENTS

| | | | |
|---|---|---|---|
| 2004/0148078 A1* | 7/2004 | Nakano et al. | 701/41 |
| 2004/0148080 A1* | 7/2004 | Ekmark et al. | 701/41 |
| 2004/0193344 A1* | 9/2004 | Suzuki | 701/41 |
| 2005/0049769 A1* | 3/2005 | Tsuchiya | 701/41 |
| 2005/0072621 A1* | 4/2005 | Hara et al. | 180/444 |
| 2005/0143896 A1* | 6/2005 | Sawada et al. | 701/96 |
| 2006/0015226 A1 | 1/2006 | Bernzen et al. | |
| 2006/0076828 A1* | 4/2006 | Lu et al. | 303/146 |
| 2007/0140423 A1* | 6/2007 | Foland | 378/57 |

FOREIGN PATENT DOCUMENTS

| | | |
|---|---|---|
| DE | 102 35 039 A1 | 2/2004 |
| DE | 103 60 582 A1 | 7/2004 |
| DE | 10360582 A1 | 7/2004 |
| DE | 103 17 991 A1 | 10/2004 |
| DE | 102004051338 A1 | 4/2006 |
| EP | 1 331 158 A1 | 7/2003 |
| FR | 2837161 A1 | 9/2003 |

* cited by examiner

METHOD AND DEVICE FOR REDUCING UNWANTED EXCITATIONS AT A STEERING WHEEL

BACKGROUND OF THE INVENTION

Field of the Invention

The invention lies in the field of automotive technology. More specifically, the invention relates to a device and method for reducing unwanted, undesireable, incorrect excitations at a steering wheel.

In conventional vehicles, the steered front wheels are coupled mechanically to the steering wheel. During driving it is therefore possible for high-frequency vibrations of the steering wheel with a low amplitude to be excited owing to an imbalance at the vehicle wheel, damage to the road, and/or owing to worn brake disks. These vibrations have an adverse effect on the driving comfort for the driver.

It has therefore generally become known to provide active or passive damping systems at the steering system. Passive damping systems, for example by way of leaf springs and stops, have the disadvantage that after installation they can no longer be changed. German patent DE 196 44 528 C1 discloses an active steering damper wherein, when a shock occurs, the damping force is set to a very high value during the shock. For this purpose shock sensors are arranged on steering gear elements near to the wheels. On the basis of the sensor signals a signal is generated which activates low-deceleration steering damping elements for a short period of time. A very fast transmission of signals is necessary for such a damping system to function. In addition, separate shock sensors are necessary.

German published patent application DE 103 17 991 A1 discloses a system for reducing unwanted excitations at the steering wheel, wherein a steering wheel angle and a wheel adjustment angle are sensed by sensors. An evaluation unit senses a phase shift between the profile of the steering wheel angle and the profile of the wheel adjustment angle and generates, as a function of the phase shift, an actuation signal for increasing the damping in the steering system. The increase in the damping is carried out by means of a steering damper which can be switched on and can be activated and deactivated by means of the actuation signal. In this context the system advantageously uses the sensor system of other programs which are already integrated in the vehicle to control the vehicle dynamics such as an electronic stability program (ESP) and/or an electromechanical steering support (EPS, electric power steering).

SUMMARY OF THE INVENTION

It is accordingly an object of the invention to provide a method and a device for reducing improper excitations at the steering wheel of a motor vehicle which overcomes the above-mentioned disadvantages of the heretofore-known devices and methods of this general type and which provides for a further improvement to the driving comfort.

With the foregoing and other objects in view there is provided, in accordance with the invention, a device for reducing unwanted excitations at a steering wheel, comprising:

a sensor system mounted to sense unwanted excitations at the steering wheel and/or a steering gear connected to the steering wheel; and a closed-loop control unit connected to said sensor system, said control unit being configured to generate an additional steering torque signal on the basis of the sensed unwanted excitation, and to cause a servomotor to apply an additional steering torque on the steering gear.

In other words, an unwanted excitation at a steering wheel and/or a steering gear is sensed by way of a sensor system and an additional steering torque, which is additionally applied to the steering gear by a servomotor, is generated on the basis of the sensed unwanted excitation in a closed-loop control unit. An anticipated unwanted excitation of the steering wheel owing to an imbalance at the vehicle wheel, damage to the road and/or owing to warn brake disks can be sensed near to the wheels. By superimposing the additional steering torque on the unwanted excitation the unwanted excitation of the steering wheel is reduced and at best compensated. The servomotor acts here as an active damping element. The servomotor is to be embodied in such a way that high-frequency excitations can be applied. The servomotor of an electromechanical steering system is preferably used so that no additional device requirements arise. Excitation of the steering gear and/or of the steering wheel can be determined by evaluating a wheel position angle, a steering angle or a steering torque at the steering wheel or similar variables.

In accordance with an added feature of the invention, a filter extracts low-frequency excitations at the steering wheel and/or the steering gear in order to actuate the servomotor by means of the additional steering torque. This prevents intrinsic behavior of the steering system being adversely affected by the reduction in unwanted excitations. The filter may be arranged upstream of the closed-loop control unit or downstream of the closed-loop control unit here or be constructed as a software filter together with it.

In accordance with an additional feature of the invention, the sensor system senses an angular position of the rotor of the servomotor of an electromechanical steering system and/or the steering torque of the steering wheel, wherein the sensor signals are tapped from an electromechanical steering support (EPS). In this context, the invention advantageously uses sensors from the electromechanical steering support system which are already present in the vehicle. The sensor for sensing the angular position of the rotor generally has a high resolution so that high-frequency unwanted excitations can be satisfactorily sensed.

In a further embodiment, the sensor system senses a steering wheel angle, wherein the useful signals are tapped from an electronic stability program (ESP). The invention advantageously uses signals of the electronic stability program which are already present in the vehicle here.

In a further embodiment, quantitative evaluation of the unwanted excitation to be compensated is carried out, wherein at least one limiting value is defined and when the limiting value is exceeded a fault entry is written into a monitoring unit and/or a driver is warned by means of a visual and/or audible signal. The reduction in the unwanted excitation at the steering wheel by connecting an additional steering torque increases the driving comfort. Causes which lead to the unwanted excitation are however not eliminated. The cause may be, inter alia, a defective tire. Without active damping, the defective tire results in the steering wheel being excited so that the defect can be detected by the driver. However, owing to the damping by superimposition the driver cannot detect damage to the wheel in the customary fashion. The damage is therefore assessed by reference to the additional steering torque to be applied and/or the level of the sensed unwanted excitation. When a limiting value is exceeded, suitable measures are taken.

In accordance with a concomitant feature of the invention, unwanted excitation is detected by way of a detection unit, and when unwanted excitation is detected (i.e., the signals are classified as representing an unwanted excitation) an actuation signal is generated, wherein the closed-loop control unit can be switched on or off on the basis of the actuation signal. The detection is intended to prevent intrinsic behavior being adversely affected by excessively early application of an additional steering torque.

Other features which are considered as characteristic for the invention are set forth in the appended claims.

Although the invention is illustrated and described herein as embodied in a method and device for reducing unwanted excitations at a steering wheel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
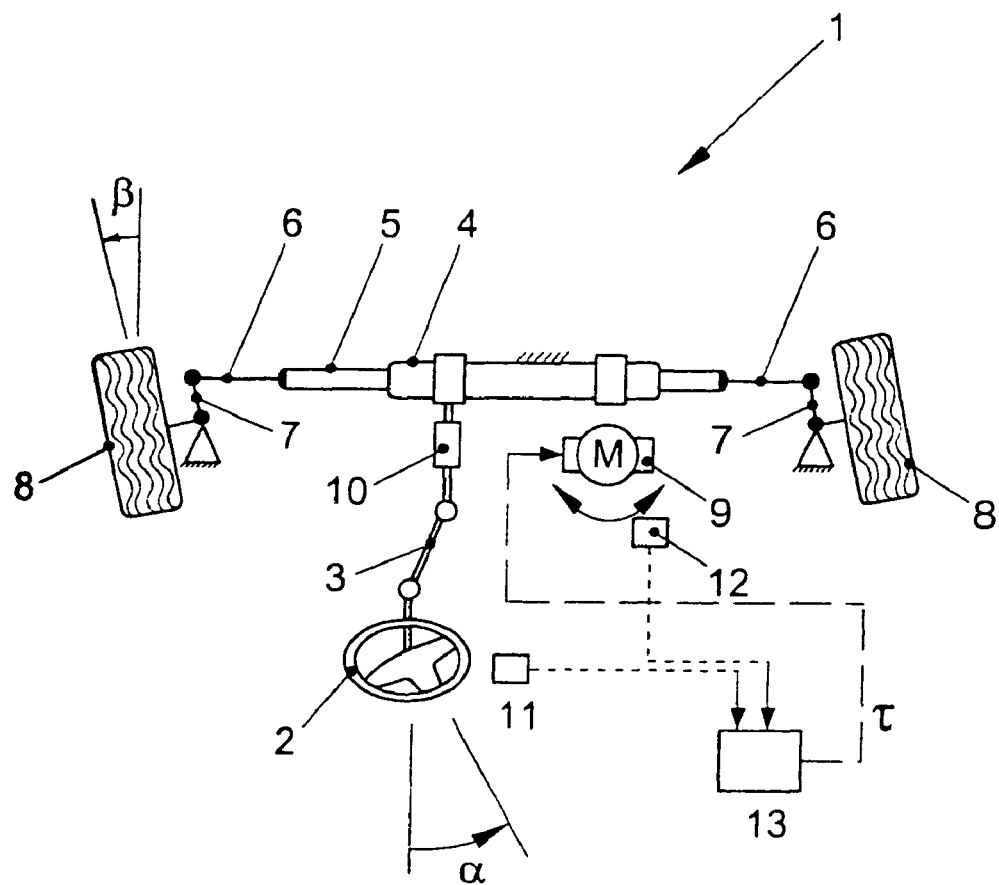
FIG. 1 is a schematic illustration of a steering system for a vehicle having a system according to the invention for reducing an unwanted excitation of a steering wheel.

Referring now to the figures of the drawing in detail and first, particularly, to FIG. 1 thereof, there is shown a schematic view of a motor vehicle steering system 1 which is embodied as an electromechanical steering system. The steering system 1 comprises a steering wheel 2 which is coupled mechanically to a steering gear 4 by way of a steering spindle 3. A steering instruction which is input at the steering wheel 2 is transmitted to a toothed rack 5 via the steering spindle 3 and the steering gear 4. The toothed rack 5 is connected to rack rods 6 which each engage on a wheel carrier 7. The wheel carriers 7 support the vehicle wheels 8.

The steering system 1 also comprises a servomotor 9, or steering assist motor 9, for an electromechanical steering support (EPS). The servomotor 9 is actuated for a steering support as a function of a torque (torsion moment) of the steering spindle 3. For this purpose, the steering spindle 3 is embodied with a torsion sensor 10.

According to the invention, the steering system 1 is embodied with a system for compensating unwanted excitations at the steering wheel 2, comprising a sensor system. Unwanted excitation at a steering wheel and/or a steering gear can be sensed by way of the sensor system.

In the illustrated embodiment, the system uses for this purpose the sensor devices 10, 11, 12 of the electromechanical steering support and of an electronic stability program (ESP). In this context, the corresponding information from the electromechanical steering support and the electronic stability program are tapped for the system for compensating unwanted excitations. The steering torque of the steering wheel 2 can be sensed by means of the torsion sensor 10. The sensor device 12 can sense an angular position of the rotor of the servomotor 9, and thus indirectly a wheel position angle β. The sensor device 11 of the electronic stability program can sense a steering wheel angle α.

In addition it is conceivable to integrate a further sensor system into the steering system 1. For example, the wheel position angle β could be sensed directly by way of a suitable sensor system. This would have the advantage that unwanted excitations of the steering wheel would be able to be detected at the location where they are generated, and thus be detected quickly and unambiguously.

The signals of the sensor units 10, 11, 12 are fed to an evaluation unit 13. The signals are evaluated in the evaluation unit 13. If an unwanted excitation of the steering wheel 2 by the evaluation unit is detected, an additional steering torque τ is generated and applied to the servomotor 9.

Figure 2:
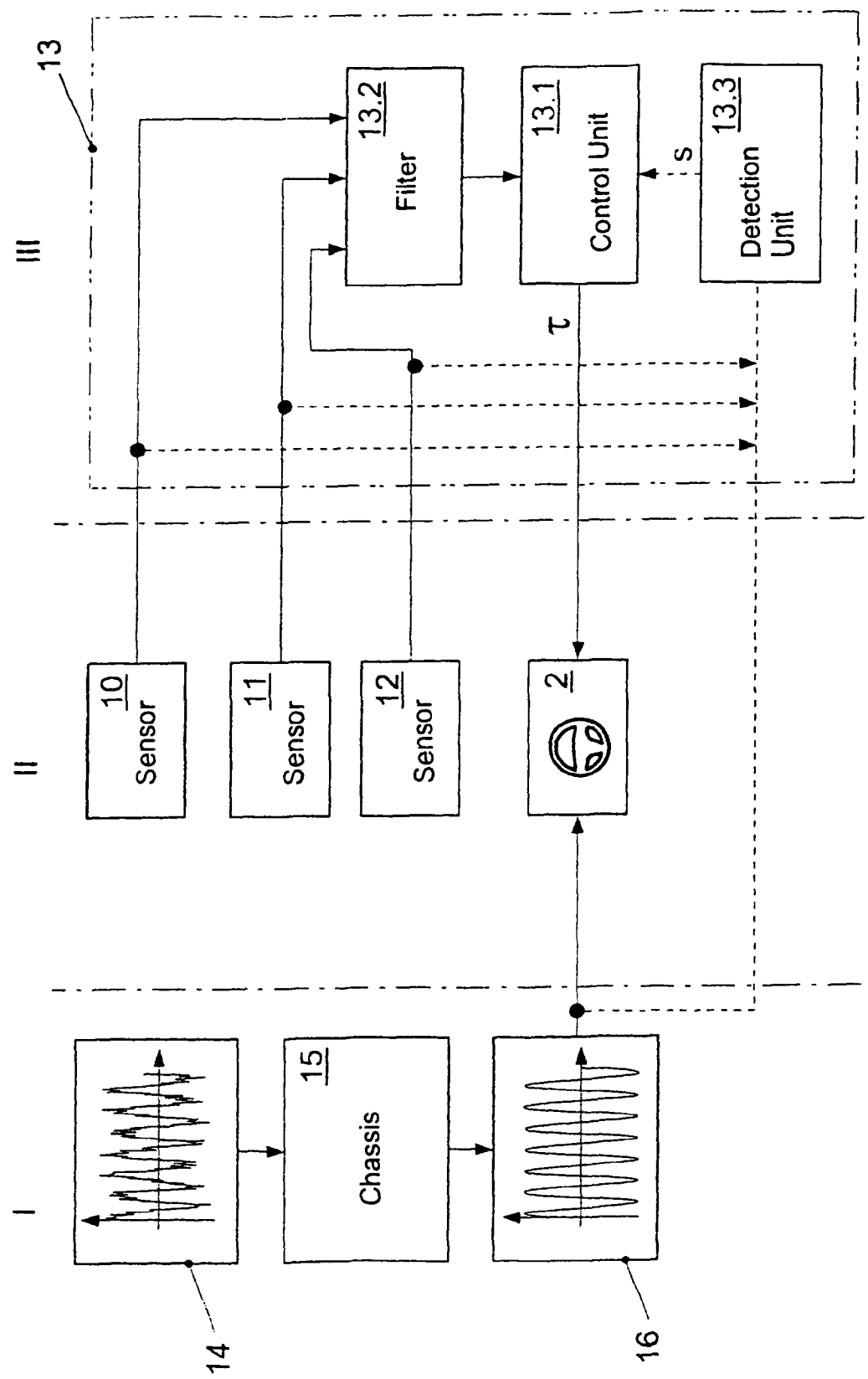
FIG. 2 is a block diagram of the system for reducing the unwanted excitation of the steering wheel.

FIG. 2 is a schematic view of an unwanted excitation of the steering wheel 2 and its reduction. The illustration can be divided into the three parts: interference or unwanted excitation I, steering or system II, and reduction III.

The unwanted excitation I is based on periodic excitation or interference 14 which is transmitted to the steering wheel 2 via a chassis 15. The chassis 15 comprises the elements illustrated in FIG. 1 of the steering spindle 3, steering gear 4, toothed rack 5, rack rods 6, wheel carriers 7 and vehicle wheels 8. The chassis 15 acts as a transmission element. Properties of the chassis 15 have a large influence on the resulting excitation of the steering wheel 2. For example, the interference 14 may result in excitation of the chassis 15 at its natural frequency. However, the chassis 15 generally acts as a filter on the interference 14. The steering wheel 2 is excited by the resulting unwanted excitation 16.

The suppression or reduction in the unwanted excitation is carried out by way of the evaluation unit 13, comprising a regulator or closed-loop control unit 13.1, a filter 13.2, and a detection unit 13.3. The individual elements may be implemented on a common component or partly or wholly on separate components.

The unwanted excitation 16 of the steering wheel 2 can be detected by means of the sensor units 10, 11, 12 already illustrated in FIG. 1. For this purpose, the signals are fed to the detection unit 13.3. In the illustrated embodiment, the detection unit 13.3 is configured in such a way that the periodic interference/unwanted excitation is detected using an algorithm, and an actuation signal s is generated. The actuation signal is fed to the closed-loop control unit 13.2 which is activated or deactivated on the basis of the actuation signal s. Activation takes place if an unwanted excitation has been detected.

In the activated state, the closed-loop control unit 13.1 generates an additional steering torque τ which is applied to the steering gear 4, and thus to the steering wheel 2, by the steering assist motor 9. The additional steering torque τ is generated as a function of the signals of the sensor units 10, 11, 12.

For the steering system's intrinsic behavior to be adversely affected as little as possible, it is necessary to compensate only high-frequency unwanted excitations by means of the additional steering torque τ. For this purpose, a filter 13.2 which suppresses the low-frequency components from the signals of the sensor units is connected upstream of the closed-loop control unit 13.1. In another embodiment, the filter 13.2 can also be arranged downstream of the closed-loop control unit 13.1, wherein case it is not the input signals of the closed-loop control unit 13.1 which are filtered but instead the output signal.

In order to reduce the unwanted excitation, three steps are distinguished. In a first step, the periodic unwanted excitations 16 are reduced by the additional steering torque τ. This permits the driving comfort to be significantly increased. A fault which is a possible cause of the unwanted excitation is however not eliminated. If the duration and/or the magnitude of the unwanted excitations 16 exceeds a limiting value which is defined in advance, this is generally due to a fault on the vehicle and not to external influences such as damage to the road. In a second step, a fault signal is therefore written into a monitoring unit of the vehicle in addition to the application of the additional steering torque τ. The monitoring unit can be read during an inspection and the unwanted excitation which occurs only during driving can be detected in the workshop. The cause of the fault can then be eliminated by way of suitable measures. In a third step, the driver is warned immediately by way of a warning signal (e.g., audible signal, visual signal, etc.). This is necessary for example, if the unwanted excitation exceeds a defined critical threshold value, which would put a safe onward journey at risk.

This application claims the priority, under 35 U.S.C. §119, of German patent application No. 10 2005 003 180.3, filed Jan. 19, 2005; the entire disclosure of the prior application is herewith incorporated by reference.

We claim:

1. A device for reducing unwanted excitations at a steering wheel, comprising:
    a sensor system mounted to sense unwanted excitations at the steering wheel and/or a steering gear connected to the steering wheel; and
    a closed-loop control unit connected to said sensor system, said control unit being configured to generate an additional steering torque signal on the basis of the sensed unwanted excitation, and to cause a servomotor to apply an additional steering torque on the steering gear;
    said closed-loop control unit being configured to evaluate in quantitative and/or qualitative terms an unwanted excitation to be compensated, said unwanted excitation being due to a fault on the vehicle, and, when a pre-defined limiting value is exceeded, a fault entry is written into a monitoring unit and/or a driver is warned by a warning signal; and
    said sensor system being mounted to sense an angular position of a rotor of the servomotor of an electromechanical steering system and a steering torque of the steering wheel, the sensor signals being tapped from an electromechanical steering support.

2. The device according to claim 1, which further comprises at least one filter connected to filter out low-frequency excitations at the steering wheel and/or at the steering gear to prevent low-frequency excitations from causing an actuation of the servomotor with the additional steering torque.

3. The device according to claim 1, wherein said sensor system is configured to sense a steering wheel angle, and the sensor signals are tapped from an electronic stability program.

4. The device according to claim 1, which further comprises a detection unit configured to detect unwanted excitation and, upon detecting unwanted excitation, to generate an actuation signal, wherein the actuation signal causes an application of the additional steering torque to be switched on or off on the basis of the actuation signal.

5. A device for reducing unwanted excitations at a steering wheel, comprising:
    a sensor system mounted to sense unwanted excitation at the steering wheel and/or a steering gear connected to the steering wheel;
    a servomotor connected to apply a steering torque to the steering gear;
    said sensor system being mounted to sense an angular position of a rotor of the servomotor of an electromechanical steering system and a steering torque of the steering wheel;
    a closed-loop control unit connected to receive sensor signals from said sensor system, configured to generate an additional steering torque signal on the basis of the sensor signals, and connected to output the additional steering torque signal and to thereby direct said servomotor to apply the additional steering torque to the steering gear; and
    said closed-loop control unit being configured to evaluate in quantitative and/or qualitative terms an unwanted excitation to be compensated, said unwanted excitation being due to a fault on the vehicle, and, when a pre-defined limiting value is exceeded, a fault entry is written into a monitoring unit and/or a driver is warned by a warning signal.

6. The device of claim 1, wherein said sensor system being mounted to sense an angular position of a rotor of the servomotor of an electromechanical steering system has a high resolution for sensing high-frequency unwanted excitations.

7. The device of claim 1, wherein said sensor system being mounted to sense an angular position of a rotor of the servomotor of an electromechanical steering system has a high resolution for sensing high-frequency unwanted excitations.

\* \* \* \* \*